(12) United States Patent
Sheshadri et al.

(10) Patent No.: US 9,219,983 B2
(45) Date of Patent: Dec. 22, 2015

(54) MECHANISM TO REDUCE MISSING BREACH DETECTION IN GEOFENCING SOLUTION

(71) Applicant: QUALCOMM Incorporated, San Diego, CA (US)

(72) Inventors: Suhas H. Sheshadri, San Jose, CA (US); Aditya N. Srivastava, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 13/722,705

(22) Filed: Dec. 20, 2012

(65) Prior Publication Data

US 2013/0295969 A1 Nov. 7, 2013

Related U.S. Application Data

(60) Provisional application No. 61/640,722, filed on May 1, 2012, provisional application No. 61/655,982, filed on Jun. 5, 2012, provisional application No. 61/655,985, filed on Jun. 5, 2012, provisional application No. 61/655,987, filed on Jun. 5, 2012.

(51) Int. Cl.
  *H04W 4/02* (2009.01)
  *G01S 19/34* (2010.01)
  *G01S 19/52* (2010.01)
  *G01S 19/25* (2010.01)

(52) U.S. Cl.
  CPC .............. *H04W 4/021* (2013.01); *G01S 19/34* (2013.01); *G01S 19/52* (2013.01); *G01S 19/25* (2013.01)

(58) Field of Classification Search
  None
  See application file for complete search history.

(56) References Cited

U.S. PATENT DOCUMENTS

| | | | |
|---|---|---|---|
| 6,559,794 B1 | 5/2003 | Nakajima et al. | |
| 7,702,370 B2 | 4/2010 | Persico | |
| 7,848,765 B2 | 12/2010 | Phillips et al. | |
| 7,913,179 B2 * | 3/2011 | Sheha et al. | 715/769 |
| 8,125,332 B2 | 2/2012 | Curran et al. | |
| 2006/0022048 A1 | 2/2006 | Johnson | |
| 2006/0030333 A1 | 2/2006 | Ward et al. | |
| 2007/0143013 A1 | 6/2007 | Breen | |
| 2007/0155489 A1 | 7/2007 | Beckley et al. | |
| 2009/0005061 A1 | 1/2009 | Ward et al. | |
| 2009/0059899 A1 | 3/2009 | Bendelac | |

(Continued)

FOREIGN PATENT DOCUMENTS

| | | |
|---|---|---|
| EP | 2293016 A2 | 3/2011 |
| WO | 2006099632 A2 | 9/2006 |

(Continued)

OTHER PUBLICATIONS

Co-pending U.S. Appl. No. 13/722,842, filed Dec. 20, 2012.

(Continued)

*Primary Examiner* — Charles Appiah
*Assistant Examiner* — Randy Peaches
(74) *Attorney, Agent, or Firm* — Muncy, Geissler, Olds & Lowe, P.C.

(57) ABSTRACT

A system and method for a mobile device to efficiently use a geofence capability without draining its battery, and to allow flexibility in specifying various parameters related to geofencing, such as the latency and confidence in determining when or where a geofence breach occurs, and reducing the probability of not detecting a geofence breach.

40 Claims, 8 Drawing Sheets

(56) References Cited

U.S. PATENT DOCUMENTS

| | | |
|---|---|---|
| 2010/0017126 A1 | 1/2010 | Holcman et al. |
| 2010/0253508 A1 | 10/2010 | Koen et al. |
| 2010/0291947 A1 | 11/2010 | Annamalai |
| 2011/0055434 A1 | 3/2011 | Pyers et al. |
| 2011/0063138 A1 | 3/2011 | Berkobin et al. |
| 2011/0106437 A1 | 5/2011 | Husain et al. |
| 2011/0133888 A1 | 6/2011 | Stevens et al. |
| 2011/0148634 A1* | 6/2011 | Putz .............................. 340/541 |
| 2011/0298615 A1 | 12/2011 | Rich et al. |
| 2012/0008526 A1 | 1/2012 | Borghei |
| 2012/0064921 A1 | 3/2012 | Hernoud et al. |
| 2012/0098705 A1 | 4/2012 | Yost et al. |
| 2012/0115512 A1 | 5/2012 | Grainger et al. |
| 2013/0093627 A1 | 4/2013 | Cosman |

FOREIGN PATENT DOCUMENTS

| | | |
|---|---|---|
| WO | 2012000107 A1 | 1/2012 |
| WO | 2012065184 A2 | 5/2012 |

OTHER PUBLICATIONS

Co-pending U.S. Appl. No. 13/723,013, filed Dec. 20, 2012.
International Search Report and Written Opinion—PCT/US2013/038893—ISA/EPO—Sep. 17, 2013.

* cited by examiner

MECHANISM TO REDUCE MISSING BREACH DETECTION IN GEOFENCING SOLUTION

CLAIM OF PRIORITY UNDER 35 U.S.C. §119

The present Application for patent claims priority to Provisional Application No. 61/640,722, entitled "SYSTEMS, METHODS, AND/OR APPARATUSES FOR IMPLEMENTATION AND/OR UTILIZATION OF A GEOFENCE", filed May 1, 2012; Provisional Application No. 61/655,982, entitled "GEOFENCE BREACH LATENCY", filed Jun. 5, 2012; Provisional Application No. 61/655,985, entitled "GEOFENCE BREACH CONFIDENCE", filed Jun. 5, 2012; and Provisional Application No. 61/655,987, entitled "MECHANISM TO REDUCE MISSING BREACH DETECTION IN GEOFENCING SOLUTION", filed Jun. 5, 2012; and all assigned to the assignee hereof and hereby expressly incorporated by reference herein.

REFERENCE TO CO-PENDING APPLICATIONS FOR PATENT

The present Application for patent is related to the following co-pending U.S. patent Applications:

"CONCURRENT GEOFENCES WITH SHARED MEASUREMENTS", having Ser. No. 13/722,842, filed concurrently herewith, assigned to the assignee hereof, and expressly incorporated by reference herein; and "GEOFENCE BREACH CONFIDENCE", having Ser. No. 13/723,013, filed concurrently herewith, assigned to the assignee hereof, and expressly incorporated by reference herein.

FIELD OF DISCLOSURE

The present invention relates to cellular phone technology, and more particularly, to geofences.

BACKGROUND

A geofence is a virtual fence surrounding a geographic location and provides notification when a mobile device enters or leaves the geofence. Geofence capability is getting increased attention in the smartphone application and gaming market. Many application developers are creating innovative use-cases for geofences. Such examples include child location services which can notify the parents when a child leaves a designated area, wildlife management which sends alerts when wildlife strays into farmland, or advertising services which can send out coupons or offers when a person is near a shop.

A variety of positioning technologies, such as standalone GPS/GNSS (Global Positioning System/Global Navigation Satellite System), AGPS/AGNSS (Assisted GPS/GNSS), WWAN (Wireless Wide Area Network) signal based, Cell-ID based, Wi-Fi based, Sensors based, may be used to track the location of a geofencing mobile device. Continuous tracking of a mobile device results in very responsive geofence performance with high power consumption that reduces battery life. Providing responsive geofence solutions in a power optimized way can be a challenge.

SUMMARY

Embodiments of the invention are directed to systems and methods for a mobile device to efficiently use a geofence capability without draining its battery, and to allow flexibility in specifying various parameters related to geofencing, such as the latency and confidence in determining when or where a geofence breach occurs, and reducing the probability of not detecting a geofence breach.

In an embodiment, a mobile device includes a processor with memory to store instructions. The instructions, when executed on the processor, cause the processor to perform a procedure comprising: setting a location update time interval for the mobile device to an initial value; updating the location of the mobile device according to the initial value; generating a set of weights based upon a set of estimates of a velocity component of the mobile device toward a geofence; generating a predicted velocity component based on applying the set of weights to the set of estimates of the velocity component; generating a predicted time interval based on the predicted velocity component and a distance of the mobile device to the geofence; and setting the location update time interval to the predicted time interval if the predicted time interval is less than the initial value.

In an embodiment, a method to adjust a location update time interval of a mobile device includes: providing a geofence client to a processor in the mobile device, wherein the geofence client specifies a geofence and a set of parameters; determining a location calculation interval based on the geofence and the set of parameters; setting the location update time interval to the location calculation interval; generating a set of weights based upon a set of estimates of a velocity component of the mobile device toward the geofence; generating a predicted velocity component based on applying the set of weights to the set of estimates of the velocity component; generating a predicted time interval based on the predicted velocity component and a distance of the mobile device to the geofence; setting the location update time interval to the predicted time interval if the predicted time interval is less than the location calculation interval.

In an embodiment, a computer readable storage medium has stored instructions. The stored instructions, when executed by a processor of a mobile device, performs a procedure to adjust a location update time interval of the mobile device. The procedure comprises: providing a geofence client to a processor in the mobile device, wherein the geofence client specifies a geofence and a set of parameters; determining a location calculation interval based on the geofence and the set of parameters; setting the location update time interval to the location calculation interval; generating a set of weights based upon a set of estimates of a velocity component of the mobile device toward the geofence; generating a predicted velocity component based on applying the set of weights to the set of estimates of the velocity component; generating a predicted time interval based on the predicted velocity component and a distance of the mobile device to the geofence; and setting the location update time interval to the predicted time interval if the predicted time interval is less than the location calculation interval.

In an embodiment, a mobile device comprises a processor and a memory to store instructions that, when executed on the processor, causes the processor to perform a procedure comprising: means for setting a location update time interval for the mobile device to an initial value; means for updating the location of the mobile device according to the location update time interval; means for generating a set of weights based upon a set of estimates of a velocity component of the mobile device toward a geofence; means for generating a predicted velocity component based on applying the set of weights to the set of estimates of the velocity component; means for generating a predicted time interval based on the predicted velocity component and a distance of the mobile device to the geofence; and means for setting the location update time interval to the predicted time interval if the predicted time interval is less than the location update time interval.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
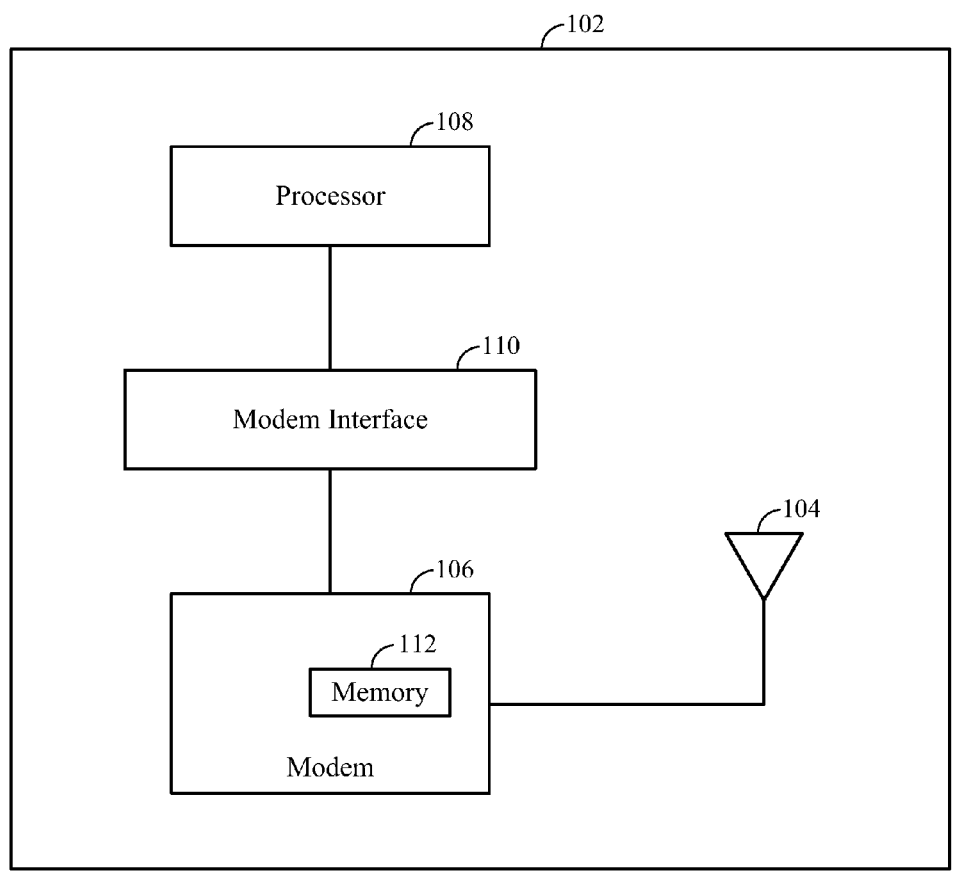
FIG. 1 is a system view of an embodiment.

FIG. 1 is a simplified abstraction of a mobile device in which embodiments may find application. The mobile device, labeled 102, comprises an antenna 104, a modem 106, and a processor 108. Modem 106 communicates with the processor 108 by way of a modem interface 110. Modem 106 includes a memory 112 for storing software instructions for execution by the modem 106.

It should be appreciated that the labeled blocks in FIG. 1 represent functional units, comprising hardware and software components. One or more semiconductor dice (chips) may be used to realize a functional unit. For example, the modem 106 may comprise more than one semiconductor chip.

Figure 2:
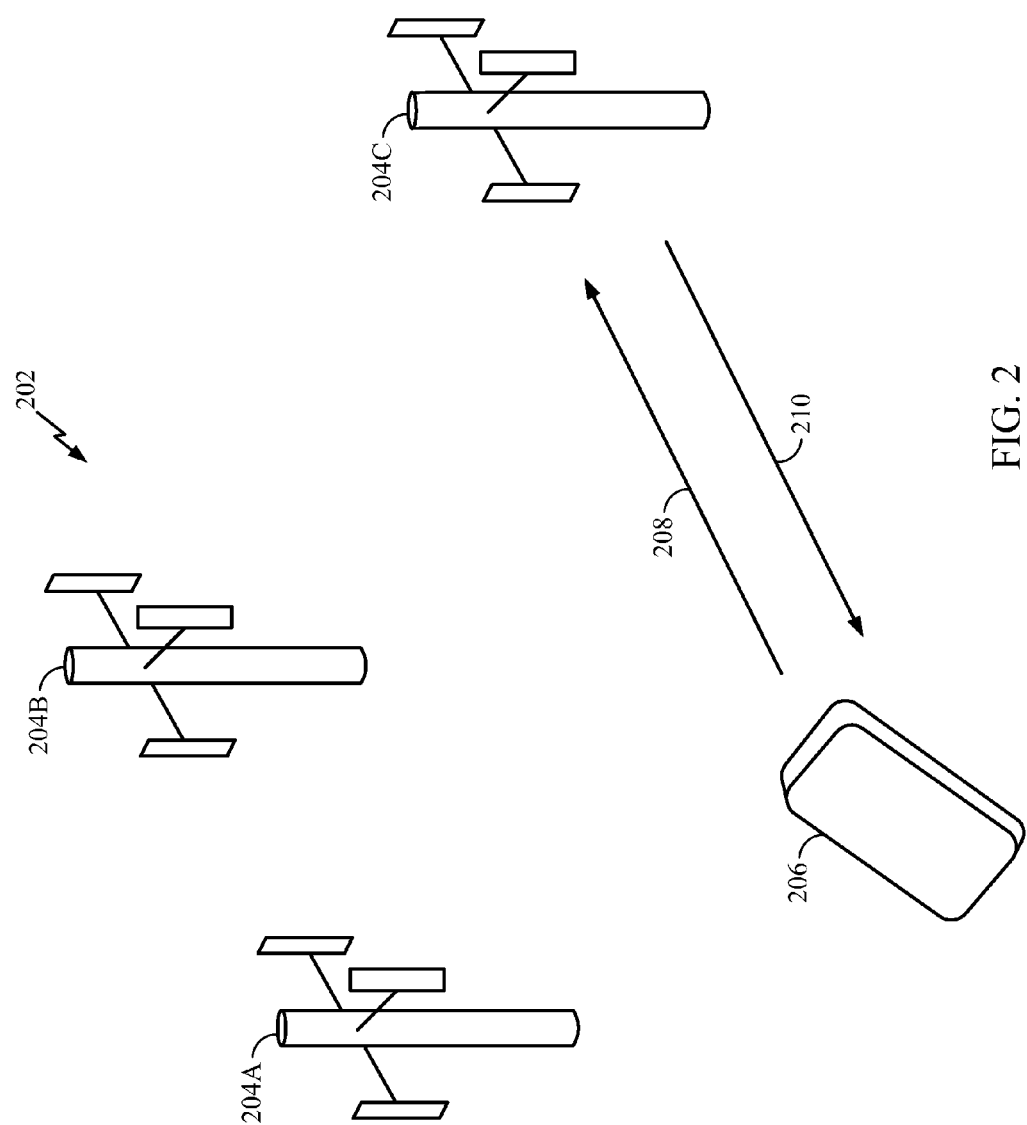
FIG. 2 illustrates the embodiment of FIG. 1 in use in a cellular phone network.

The mobile device 102 may be a cellular phone or tablet used in a cellular phone network. For example, FIG. 2 illustrates a cellular phone network 202 comprising base stations 204A, 204B, and 204C, where the mobile device 102 is located within the cell associated with base station 204C. Arrows 208 and 210 pictorially represent the uplink channel and the downlink channel, respectively, by which the mobile device 206 communicates with the base station 204C.

Many prior art geofence solutions are applications that execute on the processor 108, where the processor 108 continuously tracks the location of the mobile device 102 using positioning technologies such as GPS/Wi-Fi. One prior art example is called the "proximity alert". Data shows that a considerable amount of power is consumed when an application processor, e.g., the processor 108, is running so as to execute a typical geofencing application utilizing positioning technologies.

Embodiments described herein provide a power optimized geofencing software solution which gates the use of high power and high precision position sources with low power and low precision position sources, without impacting geofencing performance. Embodiments execute on the modem 106, so that the processor 108 may be alerted, or woken up and alerted, to deliver breach notification to the geofencing application running on the processor 108.

Embodiments may integrate Zero Power Positioning (ZPP) technology and the Gen8 GNSS core into the modem 106 for an optimal balance of responsiveness and power consumption across many geofence scenarios. This integration saves considerable power compared to running a geofencing service on the processor 108, or compared to hosted GPS/GNSS solutions where GPS/GNSS measurements are provided by a standalone chip not integrated with the modem 106.

To date, there is no established set of parameters to measure geofencing quality of service and performance. QoS (Quality of Service) parameters considered in these letters patent include the following. 1) Breach Confidence: Given a geofence breach, what is the probability that the breach event did happen at the exact geofence boundary? The higher the breach confidence, the lower the false breach notifications, and vice versa. 2) Breach Responsiveness: Given a geofence breach, what is the latency in breach detection by software? A lower latency implies higher responsiveness and lower missed breaches, and vice versa. 3) Power Usage: Defined as the total energy consumption (power used over time) with the geofence system enabled, minus the total energy consumption under identical circumstances in which the geofence system is disabled.

Embodiments provide a geofence modem service that executes (runs) on the modem 106 and only needs to alert, or to wake up and alert, the processor 108 when a breach notification needs to be sent to a geofencing application running on the processor 108. The processor 108 is not needed for geofence breach monitoring. The modem service takes care of optimizing the power needed.

The modem service monitors the state of all geofences in the system and determines the next set of actions to take based on the needs of all geofences. The state of a geofence is mainly determined by its current distance from the mobile device 102. For example, if all the geofences in the system are say 50 miles from the mobile device 102, then the location of the device does not need to be monitored say every second, and a low accuracy location (with larger horizontal error) would suffice for geofencing operations.

The issue of location accuracy brings into play a Location Source Determination function which determines which available location determination source can be used (using the lowest power) to provide the current location accuracy needs. This module gates the use of high power high precision location sources (e.g., a cold GNSS engine) with a low power low precision location sources (e.g., a Cell-ID based location).

To balance the power usage and QoS guarantees, embodiments employ a method that may be termed an Early Backoff Early Exit. This method aggressively back offs (Early Backoff) from making a location determination if it is not really needed due to present conditions, e.g., the device is stationary or far from the geofence, or if the location cannot be determined for the accuracy needed, e.g., a high accuracy location is desired but the GNSS signals are very weak.

To aggressively back off from making a location determination, there should be sufficient fast triggers to determine when a location fix is needed again, e.g., the mobile device starts moving, or to detect a change in the mobile device's environment which would enable the previously impaired location sources (e.g., the GNSS signal strength is strong again), thus enabling an Early Exit from the previously entered back off.

Determining the location of the mobile device 102 consumes more power than compared to determining the location with less precision, all other environmental factors being the same. As a result, power can be saved when backing off from high precision location fixing if the high precision is not needed or high precision sources are unavailable.

Consequently, an engine implementing the Early Backoff Early Exit method will back off from high precision location fixing if the probability of breaching a geofence is determined to be low, or if high precision sources are not available. An Early Backoff Early Exit High engine will exit the back off state when high precision location fixing is needed, provided that the probability of breaching a geofence is determined to no longer be low, or such probability is considered indeterminate, or if the high precision sources are available.

Figure 3:
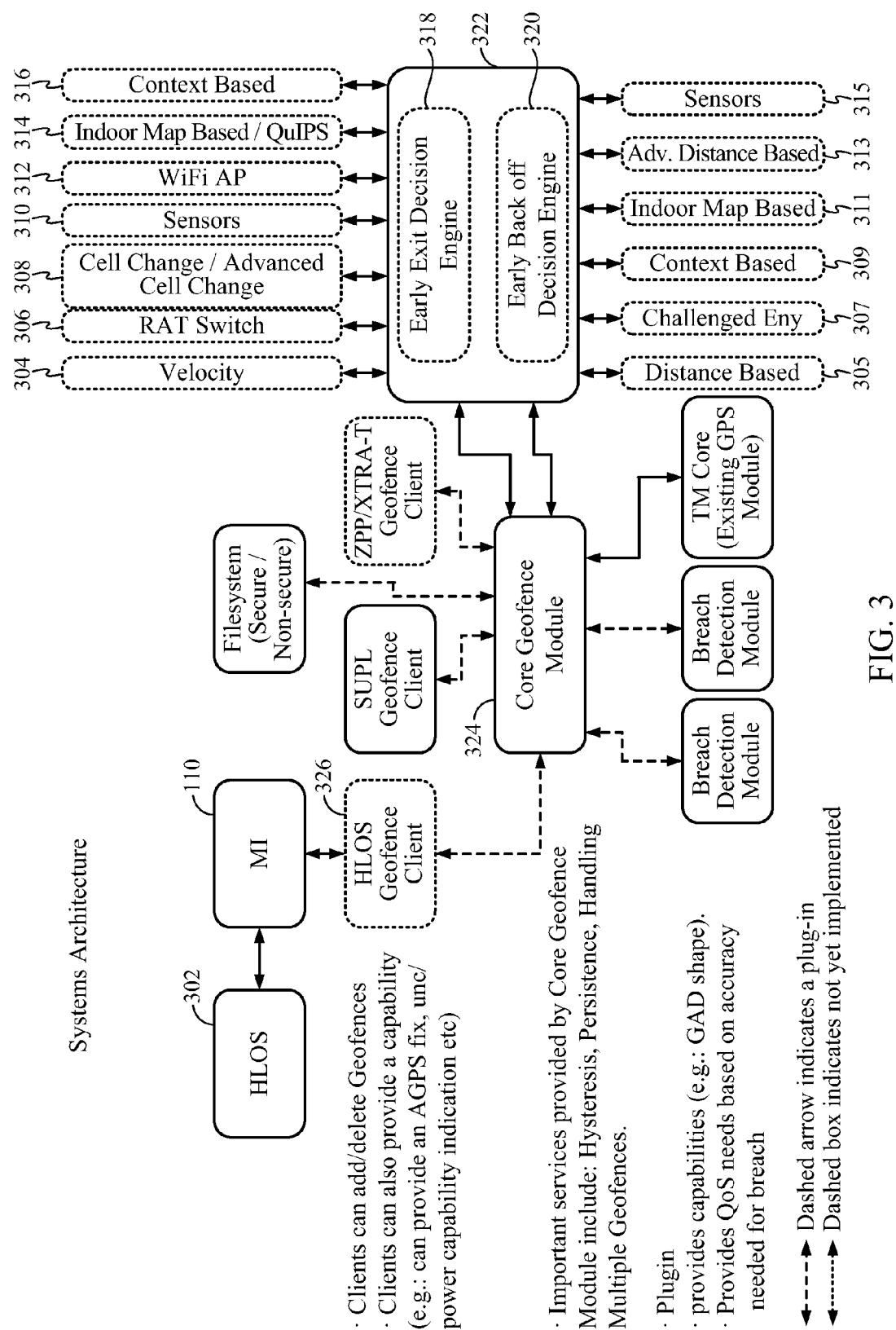
FIG. 3 illustrates an architecture according to an embodiment.

FIG. 3 illustrates a system architecture according to an embodiment. A high-level operating system (HLOS) 302 communicates with the modem 106 by way of the modem interface 110. The modules labeled 304-316 represent sources of data and measurements available to the Early Exit Decision Engine 318 and the Early Backoff Decision Engine 320, which together comprise the Early Backoff Early Exit Engine 322. Some of the modules labeled 304-316 may include receivers, such as the sensors 310 and 315.

The Core Geofence Module 324 (embedded in the modem 106) provides processing for much of the procedures discussed here so as to alert, or to wake up and alert, the processor 108 when a geofence breach occurs by signaling to the HLOS Geofence Client 326.

For many embodiments, it is expected that the largest sources of location information are WWAN-based and from ZPP position information. ZPP technology is based on determining location from existing measurements that are already available to the modem 106. Other information includes velocity of the mobile device based on PPM (Pulse Position Modulation) measurements in a CDMA (Code Division Multiple Access) tracking cell, Cell-ID, and RAT (Radio Access Technology) changes.

Other data for determining when a geofence breach occurs includes an Area ID list. This list may include WWAN cell ID information regarding the border of a geofence, or WWAN cell ID information for cells completely within a geofence. These lists may be provided by AGPS (Assisted-GPS) networks.

Other methods for determining a geofence breach include an Advanced Distance Based Backoff method. This method reduces the rate at which location is fixed when the mobile device 102 is relatively far away from the geofence, and takes into consideration cell change events which are available to the modem 106. For example, the Advanced Distanced Based Backoff method calculates the minimum number of cell changes to reach a geofence boundary. By keeping track of cell changes, the method may determine when the geofence is near and whether other sources for location fixing should be accessed.

Other methods for determining a geofence breach include a Dynamic Power Optimization Aware method. This method reduces the rate of location tracking if the GNSS engine enters into a DPO (Dynamic Positioning Operator) state.

Another method includes Positioning Fix Accuracy Setting. In this method, there are three zones outside a geofence: a near zone, and intermediate zone, and a far zone. Only low position accuracy is required for the far zone, whereas higher accuracy is needed for the intermediate zone, and the highest accuracy is needed for the near zone. Other embodiments may choose a different number of zones.

Latency may be defined as the time duration from when a geofence breach actually occurs to when the modem 106 ascertains that the breach has occurred. Geofences are set for various reasons for alerting an interested entity when the mobile device breaches a geofence. All geofences do not need the same level of service in terms of latency of breach notification. Some geofences can tolerate more latency (delay) in alerting the breach and still be useful for the purpose they were set. For example, a latency of two minutes after a breach may be sufficient for a geofence set on a venue to track how many people arrive, whereas a latency for a geofence set on a school to track a child might need a notification within 10 seconds after the child has left the school geofence.

Embodiments allow the mobile device user (or administrator of the geofence) to choose the desired latency from a discrete set, such as for example where the latency can be either low (small) or high (large). Some embodiments may have more than two discrete levels for the set of latencies. The methods described involve parameters that determine latency. Such parameters include thresholds by which the Early Backoff Early Exit engine determines whether to back off or resume fixing the location. These and other parameters include the rate at which location is updated, the threshold for the number of cell changes that signifies a geofence breach, the size and number of the zones outside the geofence in the Positioning Fix Accuracy Setting method, and the velocity of the mobile device 102, to name a few examples.

Tracking geofences at low latency has a higher power cost. In the case in which more than two geofences are set on the mobile device 102, the measured data for determining a geofence breach may be shared between the two modem processes running on the Core Geofence Module 324. In this way, there is further power efficiency. That is, when more than one geofence is set, embodiments allow the processes running on the modem to share results computed due to the needs of the lowest latency geofence. This allows improved latency than needed at no extra cost of all geofences.

Figure 9:
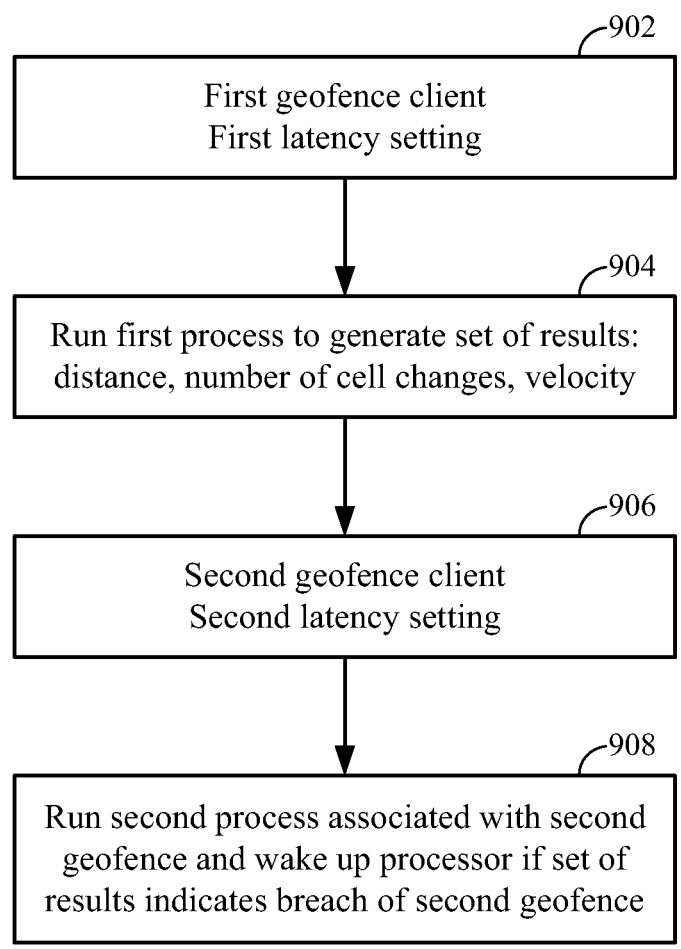
FIG. 9 illustrates a method according to another embodiment.

FIG. 9 is a flow diagram illustrating the above-described embodiment. Block 902 indicates that a first geofence client is provided to modem 106 with a first latency setting. Note that more generally, a processor other than a modem may serve a geofence client and run processes associated with that geofence, but for ease of discussion a modem is referred to as the processor running the processes associated with a geofence. Continuing with FIG. 9, block 904 indicates that a first process is run on modem 106 to generate a set of results comprising physical parameters indicative of the relationship of the mobile device to the first geofence. For example, the set of results may include the distance of the mobile device to the first geofence, a number of cell changes as the mobile device moves, and the velocity component of the mobile device towards the first geofence, as previously discussed. Block 906 indicates that a second geofence client is provided to the modem with a second latency setting. This second latency setting may be larger than the first latency setting. Block 908 indicates that a second process, associated with the second geofence, is run on the modem, and wakes up an application processor of the mobile device (e.g., processor 108) when the set of results indicates a breach of the second geofence. In this way, the first and second processes share the parameters within the set of results. Comparing one or more of the various parameters in the set of results with various thresholds may indicate a geofence breach, as discussed previously.

All geofences do not need the same level of service in terms of confidence of a breach notification. Higher confidence means a higher probability that the breach took place at the actual geofence boundary, not some appreciable distance from it. Some geofences can tolerate a lower breach confidence and still be useful for the purpose they were set. For example, a geofence breach notification 200 meters before or after an actual breach may be sufficient for a geofence set on a device to tell when a person arrives at a mall, whereas a geofence set on a school to track a child might need a notification when the child is not more than a few meters into a breach.

Tracking geofences at high confidence incurs a higher power cost. Every positioning technology provides a position with inherent uncertainty; in general it takes more time (and power) to reduce the uncertainty of the fix (position). To provide a lower breach confidence solution with the benefit of lower power, some embodiments described here run a high power positioning source for a smaller amount of time.

Figure 5:
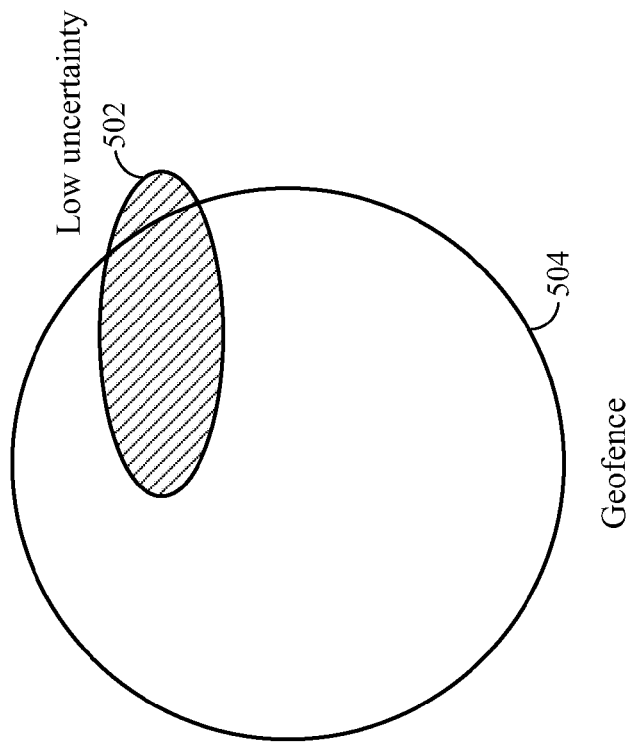
FIG. 5 illustrates a high confidence geofence breach according to an embodiment.
Figure 4:
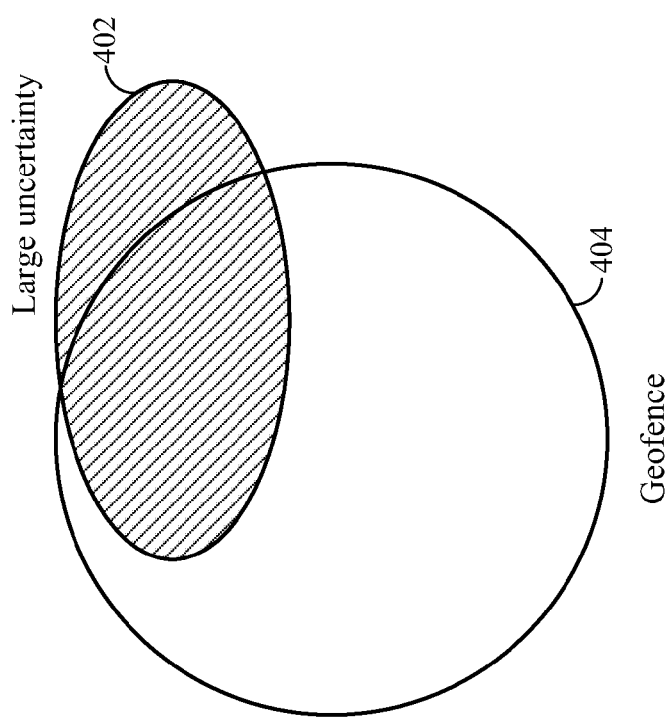
FIG. 4 illustrates a low confidence geofence breach according to an embodiment.

To illustrate, consider FIGS. 4 and 5 where a mobile device moves toward a geofence. FIG. 4 shows a relatively large position uncertainty ellipse 402 with respect to a geofence 404. A mobile device is deemed inside even at 50% overlap of the position uncertainly ellipse 402 with the geofence 404. This results in relatively low confidence, but requires relatively low power. FIG. 5 shows a relatively small position uncertainty ellipse 502 with respect to a geofence 504. A mobile device is deemed inside where there is at least 95% overlap of the position uncertainty ellipse 502 with the geofence 504. This results in relatively high confidence, which requires relatively high power.

In some cases, a high uncertainty position (small uncertainly ellipse) can be determined using positioning sources such as WWAN, which consumes less power than a higher power consumption source such as GNSS/GPS. However, in some cases, embodiments may run a GNSS/GPS receiver under certain conditions but for a relatively small time duration.

Embodiments allow the mobile device user (or administrator of the geofence) to choose the desired breach confidence from a discrete set, such as for example where the breach confidence can be either low (small) or high (large). Some embodiments may have more than two discrete levels for the set of breach confidences. The methods described involve parameters that determine breach confidence. Such parameters include the particular kind of receiver (positioning source) chosen to fix location, and the length of time for which such receivers are active to fix the location.

A user may specify a breach confidence value or setting from a discrete set of values, and the modem 106 may select a combination of receiver and time interval for collecting location information that yields the desired breach confidence setting. This information may be stored as a table in the memory 112 of the modem 106. Entries in the table are indexed by a breach confidence setting, where an entry stores a receiver and time interval that yield the desired breach confidence setting.

Figure 8:
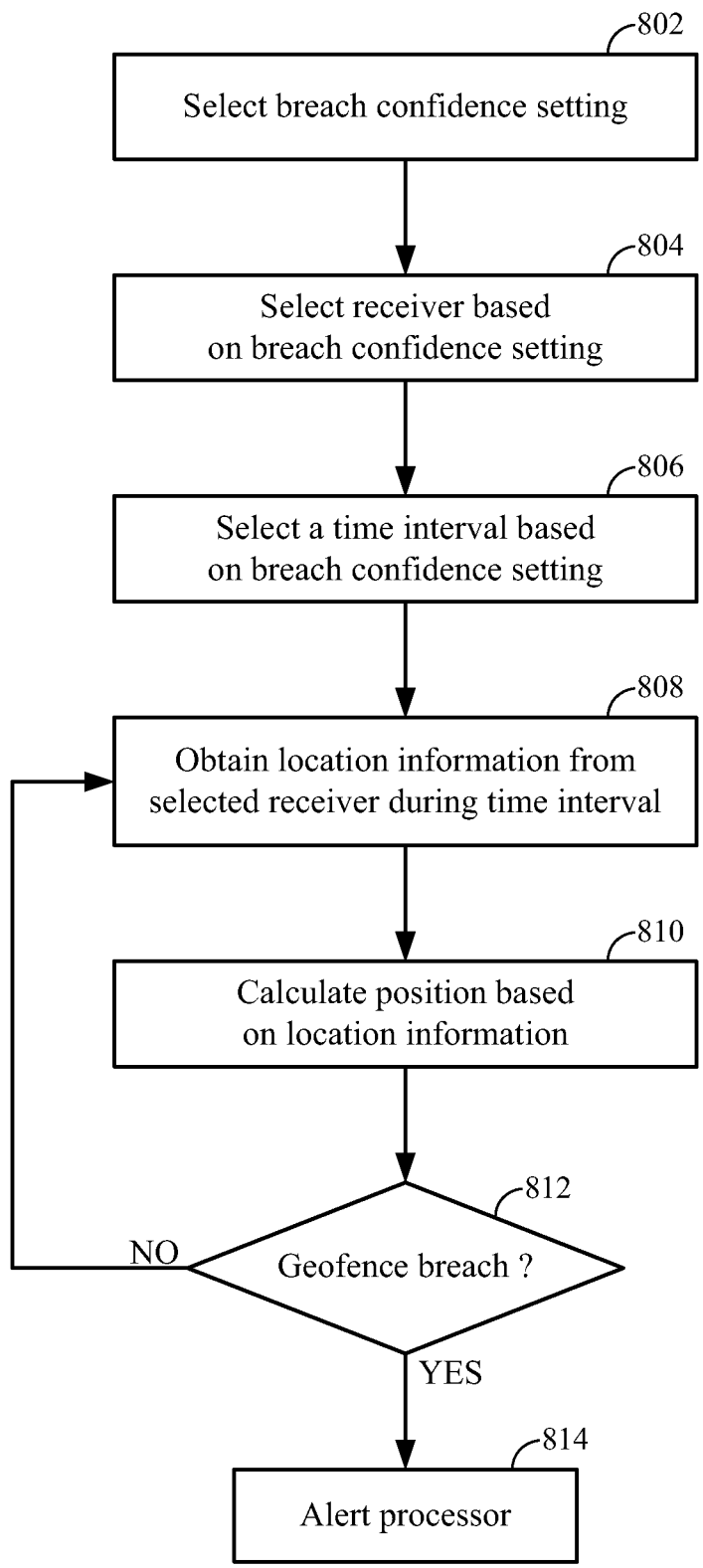
FIG. 8 illustrates a method according to another embodiment.

FIG. 8 is a flow diagram illustrating the above-described embodiment. A user selects a setting for the desired breach confidence (802). Based upon the selected breach confidence setting, a receiver in the mobile device is selected (804) and the time interval over which the selected receiver is to be operated is also selected (806). During the selected time interval, location information is obtained from the selected receiver (808), and from this location information the position of the mobile device is calculated (810). If a determination is made that there is a breach of the geo-fence (812), then the application processor is alerted (814). If the processor is in a sleep state, then it is to be understood that the alert also includes waking up the processor. If there is no detection of a geofence breach, then the position of the mobile device may be updated at a later time.

Other embodiments help to mitigate missing a geofence breach detection by adjusting the location update time interval, depending upon velocity of the mobile device. As discussed previously, the time interval at which the mobile device's location is updated may depend upon such factors as the desired latency and confidence of breach. This calculated time interval may further be modified to take into account the velocity of the mobile device in order to reduce the probability of missing a geofence due to the motion of the mobile device. The term "location calculation interval" may be used to refer to the value of the location update time interval before it is adjusted to take into account velocity as described below.

To calculate the location of a mobile device, a geofence solution may use different location technologies such as GPS, Wi-Fi, or cell sector based technologies, for example. Each location technology varies in its accuracy and its susceptibility to the local environment of the mobile device. In some environments, the GPS, Wi-Fi, or other cell sector based signal may be non-existent or of such low power that a location cannot be practically determined for a mobile device in such an environment.

Suppose at some time instant a mobile device enters a geofence having a poor or non-existent location signal environment, but where the modem 106 has not yet indicated to the processor 108 a geofence breach because at the most recent location calculation interval the mobile device was sufficiently far way from the geofence that a breach was not detected. At the next location calculation update, it is possible that the location of the mobile device will not be determined, resulting in missing breach detection.

An example of a geofence having a poor signal environment is a geofence set tight around a house, office, or store, where inside the building there may be a weak or non-existent location signal environment.

In an embodiment, the modem 106 reduces the value of the location calculation interval to provide an adjusted location interval, based on the measured velocity of the mobile device. This increases the rate at which location is updated, which increases the probability that a geofence breach will indeed be detected.

Embodiments track the velocity of the mobile device by maintaining a history of previous GPS fixes. Embodiments may also provide velocity estimates based upon accelerometer sensors. Embodiments calculate a predicted velocity by applying a weighted average to past measured velocities, where a higher weight is given to relatively recent measured velocities and larger (in magnitude) velocities.

For example, suppose "velocity" denotes the component of a velocity vector in the direction of a geofence, and let $V_i$ denote a measurement of the component of the velocity vector toward a geofence at time instant $t_i$. The index i ranges over some integer set, such as $\{1, 2, \ldots, N\}$, where the integer N denotes a number of measurements. Then for some embodiments, a weight $W_i$ is given by $$W_i = (V_i + W_C)/L_i,$$

where $W_C$ is a constant weight and $L_i$ is how far back in time a measurement was taken for the velocity component $V_i$. That is, $L_i = t - t_i$, where t is the present time for which the weight $W_i$ is being calculated, and $t_i$ is the time at which the velocity component $V_i$ was measured. Alternatively, the above displayed equation could be written as $$W_i(t) = (V_i + W_C)/(t - t_i),$$

where the explicit time dependence of the weight is indicated.

Embodiments give the predicted velocity component towards the geofence at time t, denoted as $V_P(t)$, as $$V_P(t) = (\Sigma V_i W_i)/\Sigma W_i,$$

where the summations are over the index i. Weighted averaging helps to smooth out the effects of acceleration and deacceleration, as well as velocity jumps.

With $V_P(t)$ given above, a predicted time interval (relative to the present time) to perform a location fix, denoted as $T_P$, is given by $$T_P = (D_B - X_C)/V_P,$$

where $D_B$ denotes the present distance of the mobile device to the geofence boundary, and where $X_C$ denotes the distance before the boundary for which it is desired to attempt a location fix.

If $T_P$ is less than the present location calculation interval, then $T_P$ is taken as the new update interval. Otherwise, the present location calculation interval is not adjusted.

Embodiments employing the above method for adjusting the update interval are expected to reduce the probability of missing geofence detections at the expense of a higher update rate. This will consume more power. Accordingly, if the location calculation interval has been adjusted, then embodiments employ an exit mechanism whereby the update interval is set back to the value of the location calculation interval before it was adjusted, provided that it is beneficial to do so.

For some embodiments, the update interval is set back to the value of the location calculation interval if the mobile device is detected to be moving away from the geofence, or if the mobile device has not entered the geofence for some specified time T since the interval adjustment.

Once exited, the above procedure for adjusting the location calculation interval may be started again after some time interval, when the mobile device has moved a considerable distance from the geofence, or the next time there is a geofence breach, to give just a few examples.

Figure 6:
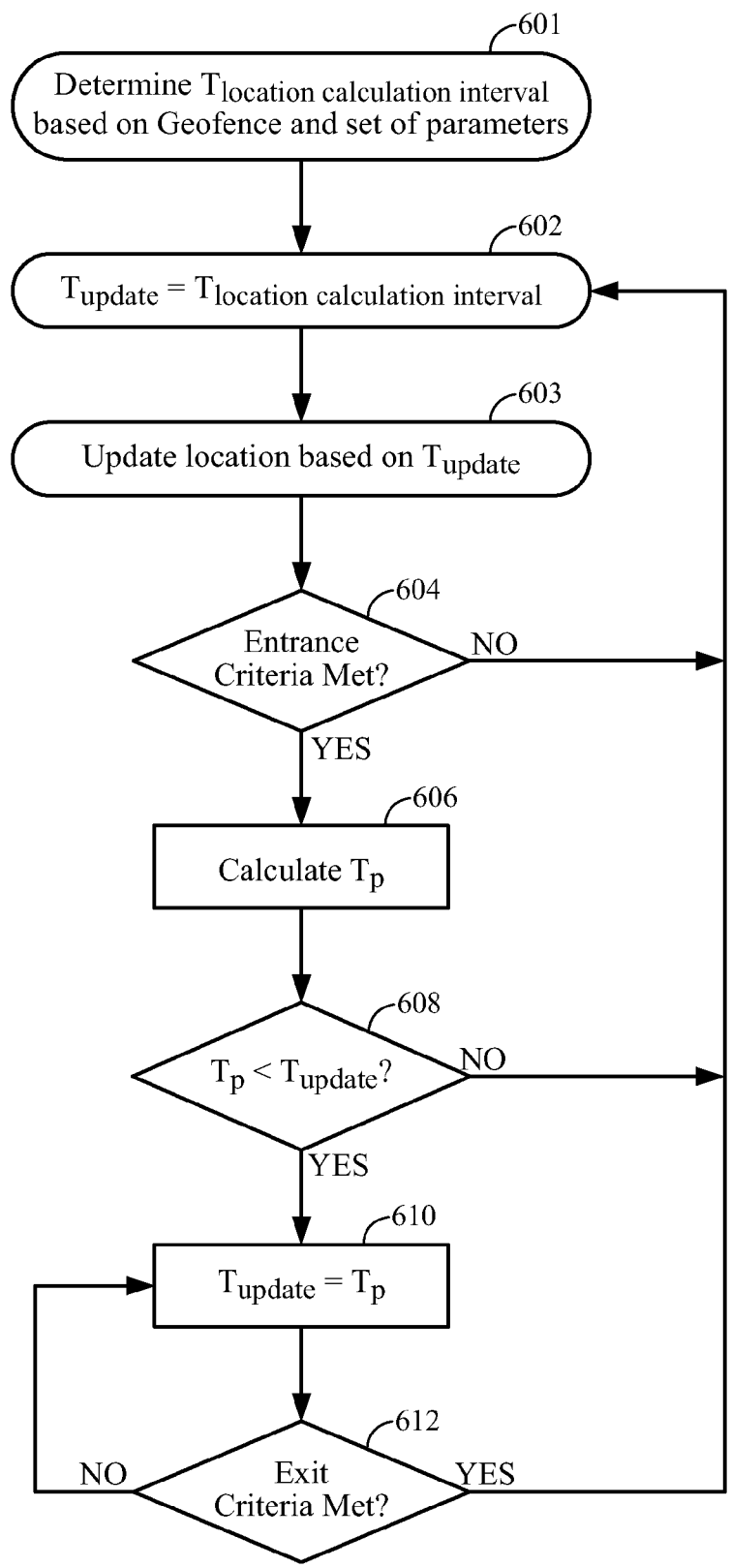
FIG. 6 illustrates a method according to an embodiment for reducing the probability of missing a geofence breach detection by providing a time update interval based upon a predicted time.

FIG. 6 illustrates a method according to the above-described embodiments. A value for the location calculation interval is determined based on a geofence and a set of parameters (601). Initially, the update interval for fixing the location is set to the location calculation interval (602). The location of the mobile device is updated according to the update interval (603). If a set of entrance criteria is met (604), then an update interval engine calculates the predicted time interval $T_P$ discussed previously (606). The set of entrance criteria may include whether the mobile device is within some pre-determined distance from the geofence, or the component of mobile device's velocity toward the geofence is greater than some threshold, for example. If the set of entrance criteria is not met, then control is returned back to 602.

Provided the entrance criteria have been met, the calculated predicted time interval $T_P$ is compared to the update interval (608). If $T_P$ is not less than the update interval, then control is brought to 602, whereas if it is less than the update interval, then the update interval is adjusted so that it is set equal to the $T_P$ (610).

If the exit criteria have been met (612), then control is brought back to 602, otherwise, the update interval stays set to $T_P$ (610).

The entrance criteria may be termed a set of entrance criteria to indicate that it may comprise only one entrance criterion, and the exit criteria may be termed a set of exit criteria to indicate that it may comprise only one exit criterion.

Figure 7:
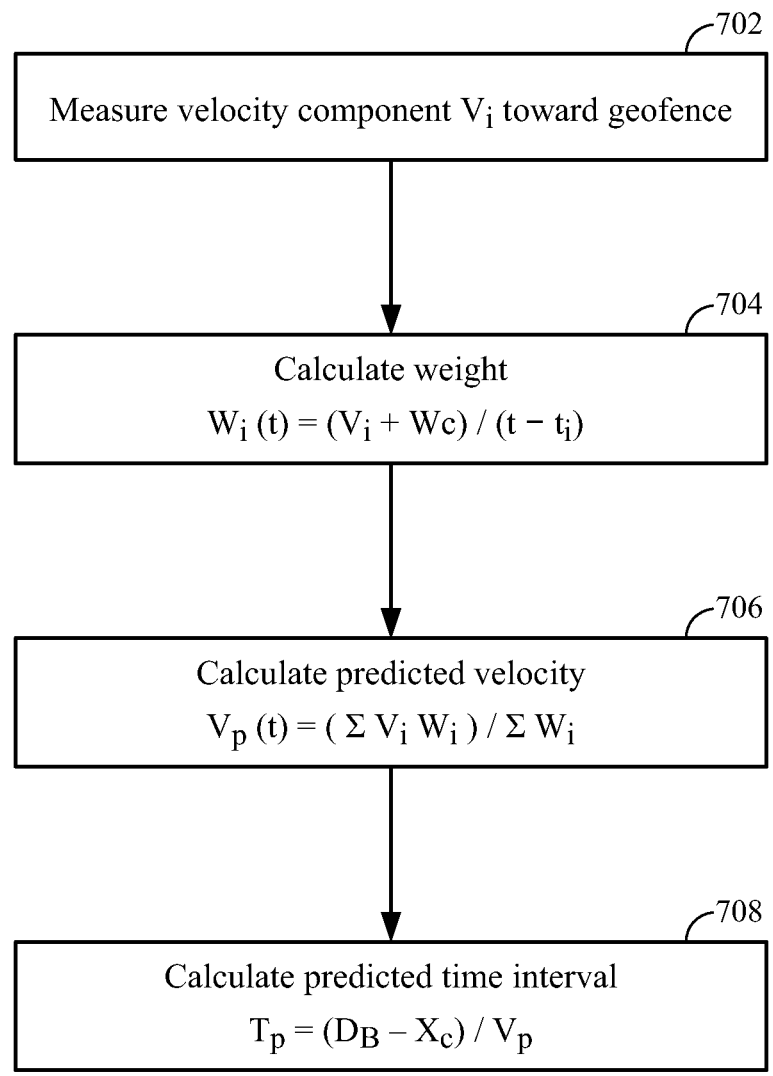
FIG. 7 illustrates a method according to an embodiment for providing the predicted time interval used in the embodiment of FIG. 6.

FIG. 7 illustrates a method according to the above-described embodiments to providing the predicted time interval $T_P$. The component of velocity toward the geofence boundary is measured or estimated at various time instances (702), and a weight is calculated for each velocity (704) value generated in box 702. These velocity values are weighted to provide a predicted velocity (706) that is used to calculate a predicted time interval $T_P$ (708) as described previously.

As described with respect to the above embodiments, there are power tradeoffs involved in choosing the latency and confidence (uncertainty ellipses) associated with geofence breaches, and that such tradeoffs include choosing the kind of location source that is accessed by the modem. Table 1 collects several location sources into three groups: High Confidence, Medium Confidence, and Low Confidence. For purposes of discussion, nominal definitions for these three levels of confidence may be taken as follows. High Confidence: 95% or greater overlap between the geofence and the position uncertainty ellipse calculated from a positioning source; Medium Confidence: 50% or greater overlap (but not greater than 95%) between the geofence and the position uncertainty ellipse; and Low Confidence: any form of geofence breach determination which is less confident than a medium level. Embodiments are not limited to these definitions, which are given merely to serve as examples. In Table 1, "TBF" stands for "time between (location) fixes."

TABLE 1

| Geofence Breach | High Confidence | Medium Confidence | Low Confidence |
|---|---|---|---|
| Hi Latency [TBF = 15 minutes] Medium Latency [TBF = 2 minutes] Low Latency [TBF = 10 sec] | 1. Standalone GPS/GNSS 2. Assisted GPS/GNSS 3. Standalone GPS/GNSS with Orbit prediction data 4. AGPS/AGNSS with orbit prediction data 5. Future equivalent sources | 1. High Confidence source used in low power mode 2. WWAN MSB 3. Wi-Fi AP based 4. Sensor based 5. Future equivalent sources | 1. High Confidence source used in low power mode 2. Medium Confidence source used in low power mode 3. WWAN Cell Based 4. Sensor based 5. Future equivalent sources |

Given a confidence level, multiple choices exist for using any particular location source. An important criterion for choosing a source is to choose the one that uses the least power to determine a position. This is not always straightforward. Some observations follow: If a GPS engine was used recently (say 1 second ago) and it has orbit prediction data available, it may make more sense to request a GPS fix for medium confidence instead of using a Wi-Fi based position fix. If there is another application requesting position fixes, these can be tapped into without an explicit request from geofencing.

Further observations follow: Non-positioning sources, such as motion detection, may be used to limit the rate at which the position uncertainty is increased. Such non-positioning sources may be combined with motion prediction data from WWAN and Wi-Fi application process information to give a more reliable motion prediction. In the limiting case when the mobile device is determined to be static, no new position fixing is needed for geofencing purposes. The location source determination takes that into account if some positioning sources are not available or turned off by the user.

In general, for many embodiments the location source is determined based on the 1) usage history of all the location sources; 2) the current state of the location source; and 3) the property of individual location sources.

Those of skill in the art will appreciate that the information, values, and signals described herein may be represented, evaluated, and generated using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method to use a geofence capability in a mobile device in a power efficient manner. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A mobile device comprising a processor, the processor including a memory to store instructions that, when executed on the processor, cause the processor to perform a procedure comprising:
setting a location update time interval for the mobile device to an initial value;
updating the location of the mobile device according to the location update time interval;
generating a set of weights based upon a set of estimates of a velocity component of the mobile device toward a geofence, wherein the set of weights comprises higher weights for more recent estimates of the velocity component among the set of estimates and for larger magnitude estimates of the velocity component among the set of estimates;
generating a predicted velocity component based on applying the set of weights to the set of estimates of the velocity component;
generating a predicted time interval based on the predicted velocity component and a distance of the mobile device to the geofence; and
setting the location update time interval to the predicted time interval if the predicted time interval is less than the initial value.

2. The mobile device of claim 1, the procedure further comprising;
setting the location update time interval to the initial value if a set of exit criteria is met.

3. The mobile device of claim 2, wherein the set of exit criteria is met if the mobile device is detected to be moving away from the geofence.

4. The mobile device of claim 2, wherein the set of exit criteria is met if the mobile device has not entered the geofence for some specified time T since setting the location update time interval equal to the predicted time interval.

5. The mobile device of claim 1, wherein the set of weights, denoted by $W_i$ where i=1, 2, ..., N and N denotes a number of estimates of the velocity component towards the geofence, the procedure further comprising:
   evaluating $W_i=(V_i+W_C)/L_i$, where $V_i$ denotes a measurement of the velocity component toward the geofence at time instant $t_i$, $W_C$ is a constant weight, and $L_i=t-t_i$, where t is a present time for which the weight $W_i$ is being calculated.

6. The mobile device of claim 5, the predicted velocity component towards the geofence at time t denoted as $V_P$ (t), the procedure further comprising:
   evaluating $V_P(t)=(\Sigma V_i W_i)/\Sigma W_i$, where the summation is over i=1, 2, ..., N.

7. The mobile device of claim 6, wherein the geofence has a boundary and the predicted time interval at time t is denoted as $T_P$ (t), the procedure further comprising:
   evaluating $T_P(t)=(D_B(t)-X_C)/V_P(t)$, where $D_B(t)$ denotes the distance of the mobile device to the geofence at time t, and where $X_C$ denotes the distance before the geofence for which it is desired to attempt a location fix.

8. The mobile device of claim 1, wherein the processor is an application processor.

9. The mobile device of claim 1, wherein the processor is a modem.

10. A method to adjust a location update time interval of a mobile device, the method comprising:
    providing a geofence client to a processor in the mobile device, wherein the geofence client specifies a geofence and a set of parameters;
    determining a location calculation interval based on the geofence and the set of parameters;
    setting the location update time interval to the location calculation interval;
    generating a set of weights based upon a set of estimates of a velocity component of the mobile device toward the geofence, wherein the set of weights comprises higher weights for more recent estimates of the velocity component among the set of estimates and for larger magnitude estimates of the velocity component among the set of estimates;
    generating a predicted velocity component based on applying the set of weights to the set of estimates of the velocity component;
    generating a predicted time interval based on the predicted velocity component and a distance of the mobile device to the geofence; and
    setting the location update time interval to the predicted time interval if the predicted time interval is less than the location calculation interval.

11. The method of claim 10, further comprising:
    setting the location update time interval to the location calculation interval if a set of exit criteria is met.

12. The method of claim 11, wherein the set of exit criteria is met if the mobile device is detected to be moving away from the geofence.

13. The method of claim 11, wherein the set of exit criteria is met if the mobile device has not entered the geofence for some specified time T since setting the location update time interval equal to the predicted time interval.

14. The method of claim 10, the set of parameters comprising a geofence breach latency.

15. The method of claim 10, the set of parameters comprising a breach confidence.

16. The method of claim 10, wherein the set of weights, denoted by $W_i$ where i=1, 2, ..., N and N denotes a number of estimates of the velocity component towards the geofence, the method further comprising:
    evaluating $W_i=(V_i+W_C)/L_i$, where $V_i$ denotes a measurement of the velocity component toward the geofence at time instant $t_i$, $W_C$ is a constant weight, and $L_i=t-t_i$, where t is a present time for which the weight $W_i$ is being calculated.

17. The method of claim 16, the predicted velocity component towards the geofence at time t denoted as $V_P$ (t), the method further comprising:
    evaluating $V_P(t)=(\Sigma V_i W_i)/\Sigma W_i$, where the summation is over i=1, 2, ..., N.

18. The method of claim 17, wherein the geofence has a boundary and the predicted time interval at time t is denoted as $T_P$ (t), the method further comprising:
    evaluating $T_P(t)=(D_B(t)-X_C)/V_P(t)$, where $D_B(t)$ denotes the distance of the mobile device to the geofence at time t, and where $X_C$ denotes the distance before the geofence for which it is desired to attempt a location fix.

19. The method of claim 10, wherein the processor is an application processor.

20. The method of claim 10, wherein the processor is a modem.

21. A non-transitory computer readable storage medium having stored instructions, the stored instructions when executed by a processor of a mobile device to perform a procedure to adjust a location update time interval of the mobile device, the procedure comprising:
    providing a geofence client to a processor in the mobile device, wherein the geofence client specifies a geofence and a set of parameters;
    determining a location calculation interval based on the geofence and the set of parameters;
    setting the location update time interval to the location calculation interval;
    generating a set of weights based upon a set of estimates of a velocity component of the mobile device toward the geofence, wherein the set of weights comprises higher weights for more recent estimates of the velocity component among the set of estimates and for larger magnitude estimates of the velocity component among the set of estimates;
    generating a predicted velocity component based on applying the set of weights to the set of estimates of the velocity component;
    generating a predicted time interval based on the predicted velocity component and a distance of the mobile device to the geofence; and
    setting the location update time interval to the predicted time interval if the predicted time interval is less than the location calculation interval.

22. The non-transitory computer readable storage medium of claim 21, the procedure further comprising:
    setting the location update time interval to an initial value if a set of exit criteria is met.

23. The non-transitory computer readable storage medium of claim 22, wherein the set of exit criteria is met if the mobile device is detected to be moving away from the geofence.

24. The non-transitory computer readable storage medium of claim 22, wherein the set of exit criteria is met if the mobile device has not entered the geofence for some specified time T since setting the location update time interval equal to the predicted time interval.

25. The non-transitory computer readable storage medium of claim 21, the set of parameters comprising a geofence breach latency.

26. The non-transitory computer readable storage medium of claim 21, the set of parameters comprising a breach confidence.

27. The non-transitory computer readable storage medium of claim 21, wherein the set of weights, denoted by $W_i$ where i=1, 2, . . . , N and N denotes a number of estimates of the velocity component towards the geofence, the procedure further comprising:

evaluating $W_i=(V_i+W_C)/L_i$, where $V_i$ denotes a measurement of the velocity component toward the geofence at time instant $t_i$, $W_C$ is a constant weight, and $L_i=t-t_i$, where t is a present time for which the weight $W_i$ is being calculated.

28. The non-transitory computer readable storage medium of claim 27, the predicted velocity component towards the geofence at time t denoted as $V_P(t)$, the procedure further comprising:

evaluating $V_P(t)=(\Sigma V_i W_i)/\Sigma W_i$, where the summation is over i=1, 2, . . . , N.

29. The non-transitory computer readable storage medium of claim 28, wherein the geofence has a boundary and the predicted time interval at time t is denoted as $T_P(t)$, the procedure further comprising:

evaluating $T_P(t)=(D_B(t)-X_C)/V_P(t)$, where $D_B(t)$ denotes the distance of the mobile device to the geofence at time t, and where $X_C$ denotes the distance before the geofence for which it is desired to attempt a location fix.

30. The non-transitory computer readable storage medium of claim 21, wherein the processor is an application processor.

31. The non-transitory computer readable storage medium of claim 21, wherein the processor is a modem.

32. A mobile device comprising a processor, and a memory to store instructions that, when executed on the processor, cause the processor to perform a procedure comprising:

means for setting a location update time interval for the mobile device to an initial value;

means for updating the location of the mobile device according to the location update time interval;

means for generating a set of weights based upon a set of estimates of a velocity component of the mobile device toward a geofence, wherein the set of weights comprises higher weights for more recent estimates of the velocity component among the set of estimates and for larger magnitude estimates of the velocity component among the set of estimates;

means for generating a predicted velocity component based on applying the set of weights to the set of estimates of the velocity component;

means for generating a predicted time interval based on the predicted velocity component and a distance of the mobile device to the geofence; and means for setting the location update time interval to the predicted time interval if the predicted time interval is less than the location update time interval.

33. The mobile device of claim 32, the procedure further comprising:

means for setting the location update time interval to the initial value if a set of exit criteria is met.

34. The mobile device of claim 33, wherein the set of exit criteria is met if the mobile device is detected to be moving away from the geofence.

35. The mobile device of claim 33, wherein the set of exit criteria is met if the mobile device has not entered the geofence for some specified time T since setting the location update time interval equal to the predicted time interval.

36. The mobile device of claim 32, wherein the set of weights, denoted by $W_i$ where i=1, 2, . . . , N and N denotes a number of estimates of the velocity component towards the geofence, the procedure further comprising:

means for evaluating $W_i=(V_i+/L_i$, where $V_i$ denotes a measurement of the velocity component toward the geofence at time instant $t_i$, $W_C$ is a constant weight, and $L_i=t-t_i$, where t is a present time for which the weight $W_i$ is being calculated.

37. The mobile device of claim 36, the predicted velocity component towards the geofence at time t denoted as $V_P(t)$, the procedure further comprising:

means for evaluating $V_P(t)=(\Sigma V_i W_i)/\Sigma W_i$, where the summation is over i=1, 2, . . . , N.

38. The mobile device of claim 37, wherein the geofence has a boundary and the predicted time interval at time t is denoted as $T_P(t)$, the procedure further comprising:

means for evaluating $T_P(t)=(D_B(t)-X_C)/V_P(t)$, where $D_B(t)$ denotes the distance of the mobile device to the geofence at time t, and where $X_C$ denotes the distance before the geofence for which it is desired to attempt a location fix.

39. The mobile device of claim 32, wherein the processor is an application processor.

40. The mobile device of claim 32, wherein the processor is a modem.

* * * * *